June 12, 1956     R. G. WARNDAHL     2,750,184
FISHING ROD HANDLE WITH SCALE AND MEASURING TAPE
Filed Nov. 20, 1952
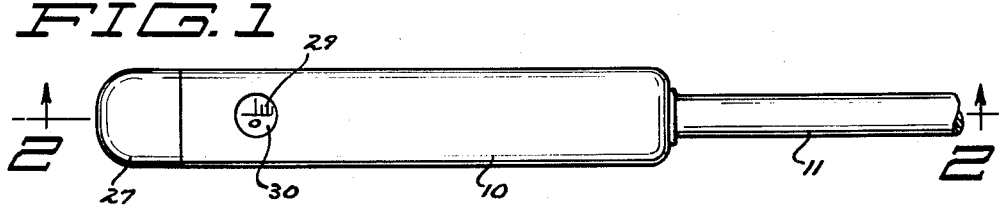
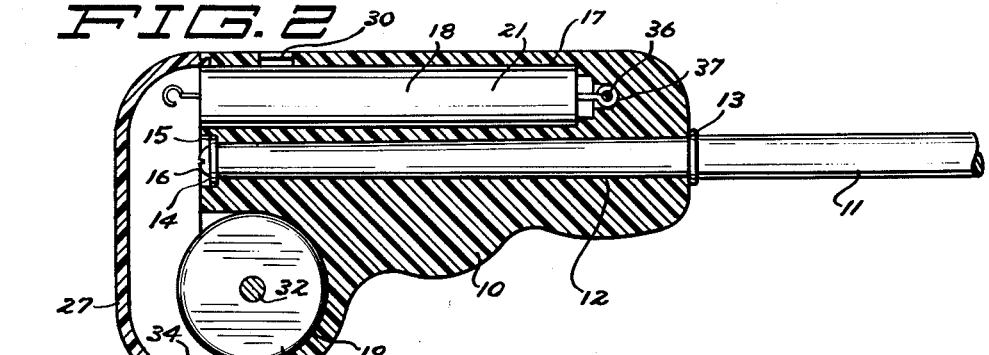
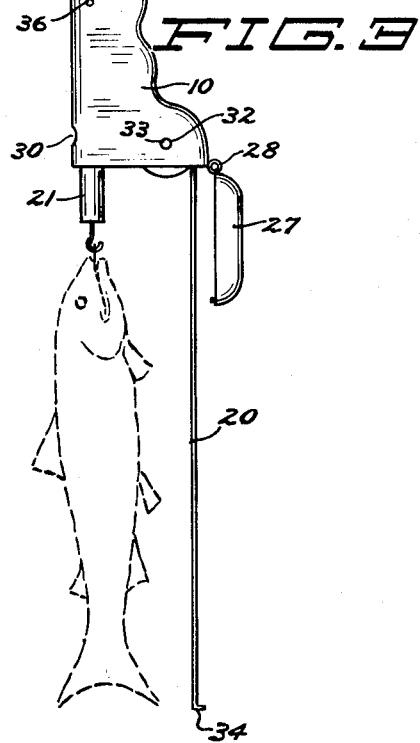
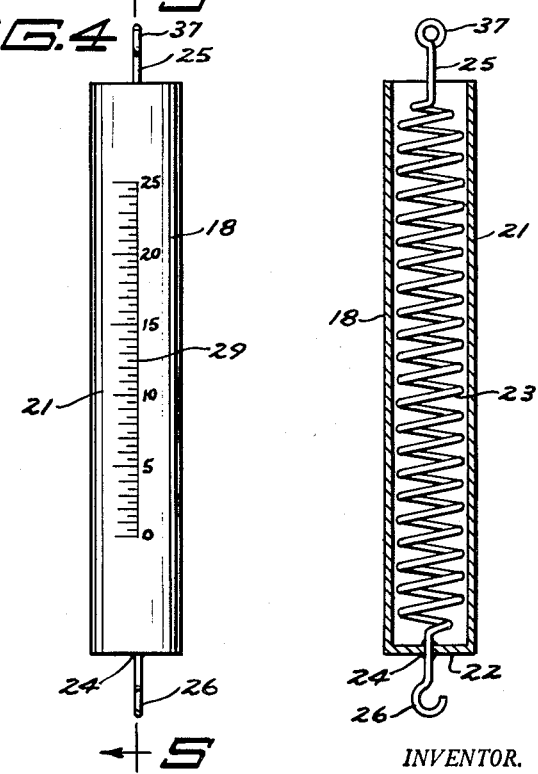
INVENTOR.
ROBERT G. WARNDAHL
BY
Braddock and Braddock
ATTORNEYS

2,750,184
FISHING ROD HANDLE WITH SCALE AND MEASURING TAPE

Robert G. Warndahl, Minneapolis, Minn.

Application November 20, 1952, Serial No. 321,654

2 Claims. (Cl. 265—63)

The invention herein has relation to a handle for fishing rods having therein a scale for weighing and a tape for measuring fish.

In the accompanying drawing forming a part of this specification,

Fig. 1 is an edge elevational view of a fishing rod handle with rod, weighing device and measuring tape incorporating features and characteristics of the invention;

Fig. 2 is a central longitudinal sectional view, taken on line 2—2 in Fig. 1;

Fig. 3 is a side elevational view, on a reduced scale, showing the fishing rod handle, weighing device and measuring tape as when applied to use;

Fig. 4 is an enlarged side elevational view of the weighing device removed from the fishing rod handle; and Fig. 5 is a detail sectional view, taken on line 5—5 in Fig. 4.

With respect to the drawing and the numerals of reference thereon, 10 denotes a handle and 11 indicates a fishing rod removably assembled with said handle.

The handle 10 has a cylindrical passageway 12 extending longitudinally therethrough, and the fishing rod 11 has an end portion thereof snugly fitted to said cylindrical passageway. An annular protuberance 13 on an intermediate part of the rod 11 is held against a forward end of the handle 10 in surrounding relation to the passageway 12 by a washer 14 retained against the rearward end of said rod, as well as against an annular shoulder 15 of said handle in surrounding relation to the rearward end of said passageway, by a screw bolt 16 threaded into the rearward end of the fishing rod.

The handle 10 is hollowed out to provide an elongated cavity 17 for receiving a weighing device or scale, represented generally at 18, and also to provide a curvilinear concavity 19 for receiving a measuring tape 20. The elongated cavity 17 and the curvilinear concavity 19 are at opposite sides of the cylindrical passageway 12, and said elongated cavity and cylindrical passageway are in parallel relation.

The measuring device or scale 18 is constituted as a tubular element 21 with bottom closure 22 and open top, a tension coil spring 23 within said tubular element and having a lower end thereof rigidly secured, as at 24, to the bottom closure 22 and an upper end 25 thereof extending above the open top of said tubular element, and a supporting hook 26 rigid with the lower end of said tension coil spring and situated beneath said bottom closure 22. The supporting hook 26 is situated adjacent the rearward end of the handle 10, normally beneath a cover member 27, hingedly supported, as at 28, upon said handle. The upper end 25 of the tension coil spring 23 is supported upon the handle 10 by a cross pin 36 in an eye 37, rigid with said upper end of said tension coil spring, and having its opposite ends fixed in the handle 10. The tubular element 21 is snugly situated in the cavity 17 to be guided by the bounding side wall thereof; see Figs. 2 and 3.

Calibrations 29, denoting pounds and ounces, longitudinally spaced along an external surface of the tubular element 21, will be visible at a sight aperture 30 in the handle 10.

The measuring tape 20 is situated within a box-like container 31, fixedly supported within the curvilinear concavity 19, and wound upon a stub shaft 32 itself suitably and conveniently mounted, as at 33, in spaced, parallel walls provided by the handle 10. The measuring tape 20 will be metallic and of the well known type resiliently urged to be wound upon the stub shaft 32. An angularly bent end 34 of the metal measuring tape 20 will become engaged with a shoulder 35 of the handle 10, adjacent the hinge 28, in such manner that said shoulder will retain said angularly bent tape end in position where accessible when the cover is open, as in Fig. 3.

In practical use of the new and improved invention, the length of a fish will be measured by employment of the tape 20 while the fish is supported upon the scale 18 to be weighed.

What is claimed is:

1. A fishing rod handle constituted as a solid body hollowed out to provide a passageway extending longitudinally through said body from end to end thereof, a cavity in said body at one side of and in parallel relation to said longitudinally extending passageway and a concavity in the body at a side of the longitudinally extending passageway opposite said cavity, a fishing rod fixed in said longitudinally extending passageway and extending through said body, a weighing device including a tubular element snugly, slidably situated in said cavity to be guided by the bounding side wall thereof, and a measuring tape supported in said concavity to be projected therefrom in parallel relation to said fishing rod and weighing device.

2. The combination as specified in claim 1, and a cover member for said weighing device and measuring tape hingedly supported upon said body.

References Cited in the file of this patent
UNITED STATES PATENTS

| | | |
|---|---|---|
| 952,552 | Weldon | Mar. 22, 1910 |
| 1,031,917 | Dennison | July 9, 1912 |
| 1,113,847 | Turner | Oct. 13, 1914 |
| 2,003,893 | La Pan | June 4, 1935 |
| 2,237,370 | Shekter | Apr. 8, 1941 |
| 2,458,811 | Koscielski | Jan. 11, 1949 |
| 2,603,474 | Mandolf et al. | July 15, 1952 |